(12) United States Patent
Yang et al.

(10) Patent No.: US 8,045,970 B2
(45) Date of Patent: Oct. 25, 2011

(54) GATEWAY FOR REMOTE CONTROL AND SYSTEM AND METHOD FOR IMPLEMENTING REMOTE CONTROL

(75) Inventors: Bo Yang, Shenzhen (CN); Minglei Zuo, Shenzhen (CN); Jianfei Ma, Shenzhen (CN); Zhiyong Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 524 days.

(21) Appl. No.: 11/619,448

(22) Filed: Jan. 3, 2007

(65) Prior Publication Data

US 2007/0149189 A1     Jun. 28, 2007

Related U.S. Application Data

(63) Continuation of application No. PCT/CN2006/001381, filed on Jun. 19, 2006.

(30) Foreign Application Priority Data

Jul. 6, 2005    (CN) .......................... 2005 1 0080691

(51) Int. Cl.
    *H04M 11/00*      (2006.01)
(52) U.S. Cl. ............... 455/419; 379/102.01; 379/102.03
(58) Field of Classification Search .......... 455/415–420; 379/102.01–102.07
See application file for complete search history.

(56) References Cited

U.S. PATENT DOCUMENTS

| | | | |
|---|---|---|---|
| 4,872,195 A * | 10/1989 | Leonard | 379/40 |
| 5,748,104 A * | 5/1998 | Argyroudis et al. | 340/870.11 |
| 5,812,931 A | 9/1998 | Yuen | |
| 6,535,110 B1 * | 3/2003 | Arora et al. | 340/12.32 |
| 7,127,270 B2 * | 10/2006 | Sinclair | 455/556.1 |
| 7,221,741 B1 * | 5/2007 | Suder et al. | 379/88.21 |

(Continued)

FOREIGN PATENT DOCUMENTS

CN      1375792 A      10/2002

(Continued)

OTHER PUBLICATIONS

State Intellectual Property Office of the People's Republic of China, Written Opinion of the International Searching Authority in International Patent Application No. PCT/CN2006/001381 (Oct. 26, 2006).
European Patent Office, Examination Report in European Application No. 06742187.5 (Jun. 8, 2009).
State Intellectual Property Office of the People's Republic of China, Examination Report in Chinese Patent Application No. 2005100806911 (Nov. 23, 2007).

(Continued)

*Primary Examiner* — Jean A Gelin
*Assistant Examiner* — Michael Nguyen
(74) *Attorney, Agent, or Firm* — Leydig, Voit & Mayer, Ltd.

(57) ABSTRACT

Embodiments of the present invention disclose a gateway for remote control and system as well as a method for implementing remote control. The user side calls a telephone number to which the gateway for remote control corresponds, and the gateway for remote control puts through the call and controls a controlled device according to the information from the user side. It is possible to know and control the controlled device of the local network through the gateway for remote control that need not be online all the time. The voice prompt is defined by the own internal device of the local network, so as to enhance the expansibility and compatibility of the gateway. The user can directly control the device of the network through dialing a phone number. Embodiments of the invention are not restricted by the area, and the expense thereof is very low.

18 Claims, 5 Drawing Sheets

U.S. PATENT DOCUMENTS

| | | | |
|---|---|---|---|
| 7,257,398 B1 * | 8/2007 | Ukita et al. | 455/420 |
| 2002/0032491 A1 * | 3/2002 | Imamura et al. | 700/79 |
| 2002/0068544 A1 * | 6/2002 | Barzilay et al. | 455/406 |
| 2002/0131569 A1 * | 9/2002 | Ito et al. | 379/102.03 |
| 2003/0073432 A1 * | 4/2003 | Meade, II | 455/420 |
| 2004/0253945 A1 * | 12/2004 | Janik | 455/419 |
| 2005/0210064 A1 * | 9/2005 | Caldini et al. | 707/104.1 |

FOREIGN PATENT DOCUMENTS

| | | | |
|---|---|---|---|
| CN | 1388680 A | | 1/2003 |
| CN | 1630323 A | | 6/2005 |
| EP | 1058428 A1 | | 12/2000 |
| JP | 2004-171277 A | | 6/2004 |
| WO | WO 03085616 A1 | * | 10/2003 |
| WO | WO 2007/003099 A1 | | 1/2007 |

OTHER PUBLICATIONS

State Intellectual Property Office of the People's Republic of China, Examination Report in Chinese Patent Application No. 2005100806911 (Aug. 15, 2008).

State Intellectual Property Office of the People's Republic of China, Examination Report in Chinese Patent Application No. 2005100806911 (Apr. 10, 2009).

State Intellectual Property Office of the People's Republic of China, Examination Report in Chinese Patent Application No. 2006800122021 (Aug. 21, 2009).

2nd Office Action in corresponding Chinese Application No. 200680012202.1 (Aug. 24, 2010).

* cited by examiner

GATEWAY FOR REMOTE CONTROL AND SYSTEM AND METHOD FOR IMPLEMENTING REMOTE CONTROL

This application is a continuation of International Patent Application No. PCT/CN2006/001381, filed Jun. 19, 2006, which claims priority to Chinese Patent Application No. 200510080691.1, filed Jul. 6, 2005, all of which are hereby incorporated by reference.

FIELD OF THE INVENTION

The present invention relates to remote control techniques, and in particular, to a technique for implementing remote control through a gateway for remote control.

BACKGROUND OF THE INVENTION

Along with rapid development of digital information technology, the digital information technology goes beyond the traditional commercial limit, and electronic products of the consumption field and office equipment of enterprises have been generally digitalized. There are more and more digital entertainment devices and digitalized domestic electrical appliances in common homes. These devices are connected in a wire or wireless mode constituting a LAN (Local Area Network) within the home, so as to share the contents or the access to the Internet, or control each other conveniently, which is the concept of digital home network that the industry is conceiving and pulling off.

In the near future, the home network connecting to the Internet through a home gateway will enter a remote control application phase, so that people can remotely know and control a device within the home network while being outside the home network, for example people may remotely switch on the air-conditioner in their houses and learn in advance while being in office how much food is left in the refrigerator and remotely examine the operation of home security system.

There are two methods of implementing the digital home network in the prior art.

The first method of implementing the digital home network is that directly and remotely controlling the home network by logging on the network. The method is as the following.

The user logs on the home gateway that is a master device of the home network from the Internet in the manner of Internet Protocol (IP) addressing or domain name addressing, or through visiting the web page provided by the service provider.

The home gateway calls the corresponding application to read the current state information of various devices within the home network through a certain medium, and conducts the correlative processing and generates interface data. For example the information of each device can be collected by using the UPnP (Universal Plug and Play)/IGRS (Intelligent Grouping & Resource Sharing) protocol.

The home gateway sends the interface data to the user through the Internet. The user can see the state information of various devices in his house through a browser and control the devices by clicking various buttons to which the devices within the home network relates on the browser page.

The pages may be generated by a server of the service provider according to the data provided by the home gateway, may be organized and generated by the home gateway itself or generated and pushed to the user browser by the device itself within the home network.

The browser of the user may be a personal computer (PC), a mobile phone or other terminals with a display interface.

There are various control protocols, for example the UPnP/IGRS protocol can be used for control.

The drawbacks of the above scheme include that the user needs to pay the added surfing expenses because the home gateway has to be on-line all the time, and the terminal that can visit the Internet with a display interface is required, for example a PC, a mobile phone with a browser function.

The above leads to higher cost of remote control, for example, it is required to purchase a computer or a slap-up mobile phone. In addition, the expense is high if people surf in the Internet by using a mobile phone.

Moreover, the above two preconditions do not exist in some cases, for example, when the user goes to tour in a mountainous area which is not covered by signals, he can not surf in the Internet by using a mobile phone and can not know the operation of devices within the home network, even though it is necessary to perform the remote control at this time.

Furthermore, the mode of using the browser requires that the users have enough technical knowledge.

The second method of implementing the digital home network is that indirectly and remotely controlling the digital home network by logging on the network to receive and transmitting an E-Mail. The second method is as the following.

A user writes an E-Mail having the contents that the user wants to check and control in a special format and sends the E-Mail to a particular mail box.

A home gateway logs on the Internet periodically, visits the mail box and reads the E-Mail mentioned above.

The home gateway analyzes the content of the E-Mail, calls the corresponding application according to demands of the E-Mail, reads the current state information of various devices within the home network through a certain medium, conducts the corresponding processing and generates the interface data. For example the information of each device can be collected by using the UPnP/IGRS protocol.

The home gateway sends these data to the user by an E-Mail. The user can see the state information of various devices within the home network by browsing the E-Mail and control these devices by the interaction with the E-Mail.

The drawbacks of this method include the followings.

The response speed is low.

A terminal that can visit the E-Mail mail box on the Internet with a display interface is required, for example a PC or a mobile phone with the browser function.

The above leads to higher cost of remote control, for example, it is required to purchase a computer or a slap-up mobile phone. In addition, the expense is high if people surf in the Internet by using a mobile phone.

Moreover, the above two preconditions may not exist in some cases, for example, when the user goes to tour in a mountainous area which is not covered by the signal, he can not surf in the Internet by using the mobile phone and can not know the operation of devices within the home network, even though it is necessary to perform the remote control at this time.

Furthermore, the mode of using the browser requires that the users have enough technical knowledge.

Thus, a system and a method for remotely controlling the home network devices are needed, so as to control the device of the network directly without support of a special device or the area restriction, and with low expense.

SUMMARY OF THE INVENTION

Embodiments of the present invention provide a gateway for remote control and system as well as a method for implementing the remote control, so as to control the device of the network directly without support of a special device or area restriction, and with low expense.

An embodiment of the present intention provides a gateway for remote control, which at least includes an information receiving and processing module, a controlling signal generating module, a controlling signal sending module.

The information receiving and processing module is coupled to a phone line and configured to receive and process control information sent through the phone line by a user;

the controlling signal generating module is coupled to the information receiving and processing module, and configured to generate corresponding controlling signal according to the control information received by the information receiving and processing module;

the controlling signal sending module respectively is coupled to the controlling signal generating module and a controlled device, and configured to send controlling signal generated by the controlling signal generating module to the controlled device coupled to the controlling signal sending module.

An embodiment of the present invention further provides a system based on a gateway for remote control, the system includes a phone line for transmitting information between a user side and a gateway for remote control; the gateway for remote control configured to receive controlling signal from the phone line and control a controlled device upon processing the controlling signal; and the controlled device; the gateway for remote control is respectively coupled to the phone line and the controlled device.

An embodiment of the present invention further provides a method for implementing remote control, and the method includes;

receiving a call from a user side, and putting through the call by a gateway for remote control;

controlling a controlled device by the gateway for remote control according to control information from the user side.

It can be seen from the above technical solution provided by this invention that, in the embodiments of the present invention, the user dials a telephone number related to and connected to the gateway for remote control, and the gateway for remote control puts through the call by itself. The gateway for remote control controls each controlled device according to the information of the answering call.

EMBODIMENTS OF THE INVENTION

Embodiments of a gateway for remote control and system, as well as a method for implementing remote control are illustrated with reference to the accompanying drawings.

A First Embodiment

Figure 1:
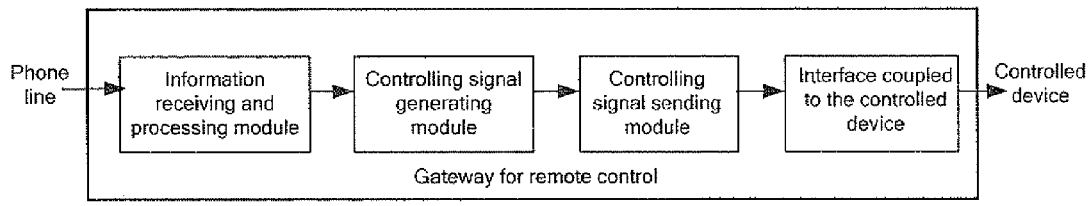
FIG. 1 is a first schematic illustrating the makeup and structure of the gateway for remote control.

As shown in FIG. 1, the gateway for remote control is composed of an information receiving and processing module, a controlling signal generating module, a controlling signal sending module and a controlled device, which are connected through their own interfaces.

The information receiving and processing module is used for receiving and processing control information sent by the user side through a phone line which may be a fixed phone line over PSTN, a phone line of wireless mode such as Personal Handset System (PHS), 3rd Generation Mobile Communications System (3GMS) and Code Division Multiple Access (CDMA), or an IP access phone line, i.e. any phone line that can be accessed by dialling a telephone number should be deemed as the phone line mentioned in the technical solution of the embodiment of the invention. After receiving the control information, the information receiving and processing module further decides whether the control information is the control information for controlling the gateway for remote control itself, if so, controls the state of the gateway for remote control; otherwise sends the control information to the controlling signal generating module;

the controlling signal generating module is used for generating corresponding controlling signal according to the control information received by the information receiving and processing module;

the controlling signal sending module is used for sending the controlling signal generated by the controlling signal generating module to an interface by which the controlled device connects to the controlling signal sending module, and sending the signal to the controlled device through the interface.

A Second Embodiment

Figure 2:
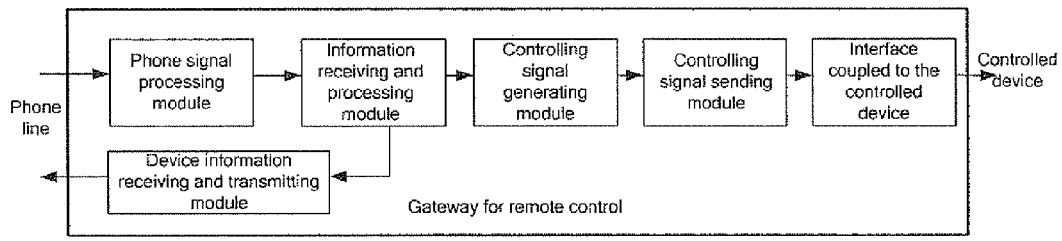
FIG. 2 is a second schematic illustrating the makeup and structure of the gateway for remote control.

As shown in FIG. 2, on the basis of the first embodiment, the gateway for remote control further incorporates a phone signal processing module. The phone signal processing module is coupled to the phone line in front of the information receiving and processing module and used for connecting the information receiving and processing module to the user side when a call is not put through under a predetermined condition. At the same time, an device information receiving and transmitting module is incorporated, and the device information receiving and transmitting module is respectively coupled to the information receiving and processing module and the phone line, and is used for sending device configuration information to the user through the phone line and collecting the device information from the controlled devices, and the configuration information may be the state information of the controlled device sent from the gateway for remote control to the calling user side, or the voice prompt information that is needed by the user in the process of controlling the device. The direction of the arrow in FIG. 2 may also be reversed, which means that the information can also be sent from the controlled devices to the device information receiving and transmitting module.

A Third Embodiment

Figure 3:
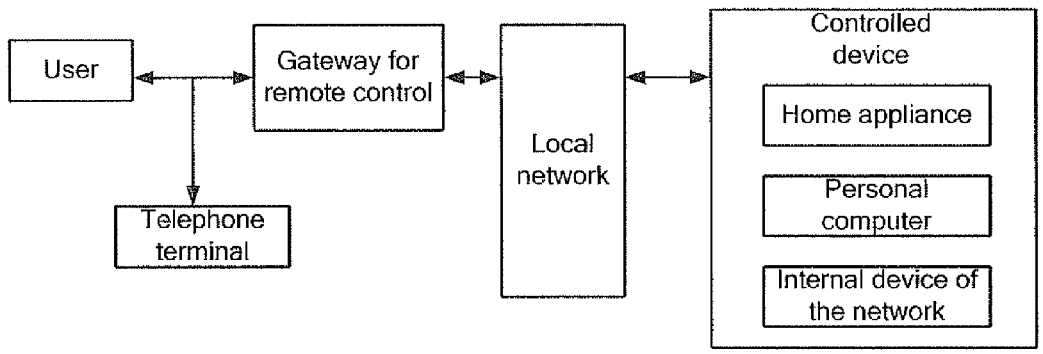
FIG. 3 is a first schematic illustrating the remote control network system based on the gateway for remote control.

As shown in FIG. 3, a system based on the gateway for remote control includes a phone line, a gateway for remote control, a local network and a controlled device; the gateway for remote control is coupled to the phone line and the controlled device respectively.

The phone line may also connect with a phone terminal.

There are one or more controlled devices, which include devices in the network such as a PC and an intelligent electric appliance.

In the system based on the gateway for remote control, the gateway for remote control may be integrated in the same physical entity with the controlled device.

The local network may include various networking techniques, such as the wire networking including the Home Phone Network Alliance (HomePNA), the Power Line Communication (PLC), the IEEE1394 and the Ethernet; the wireless networking including the Wireless Local Area Network (WLAN), the Ultra Wide Band (UWB) protocol, the Zigbee (a low rate and short distance wireless network).

The gateway for remote control connects to the gateway of the access system of the operator through a phone line which may be a fixed phone line, a wireless-mode phone line such as PHS, 3G and CDMA, or an IP accessing phone line of the NGN (Next Generation Network). Any gateway for remote control that can be accessed by dialing a telephone number should be deemed as the gateway for remote control mentioned in the technical solution of the embodiment of the invention.

In the same way, the phone signal processing module of the gateway for remote control connects to the phone access network provided by the operator through a phone line which may be a fixed phone line, a wireless mode phone line such as PHS, 3G and CDMA, or an IP accessing phone line of the NON. Any phone signal processing module that can be accessed by dialling a telephone number should be deemed as the phone signal processing module mentioned in the technical solution of the embodiment of the invention.

A Fourth Embodiment

Figure 4:
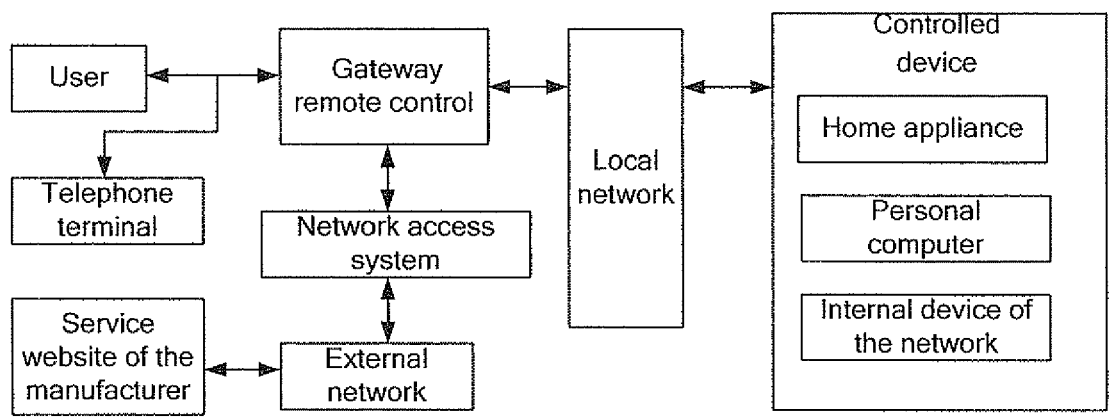
FIG. 4 is a second schematic illustrating the remote control network system based on the gateway for remote control.

As shown in FIG. 4, the system based on the gateway for remote control further includes a network access system, an external network and a service website of the manufacturer on the basis of the third embodiment. The gateway for remote control can connect to an external network, for example the Internet or the Metropolitan Area Networks (MAN), by the network access system.

For example, the gateway for remote control can dial to access the Internet by using the Asymmetric Digital Subscriber Line (ADSL) technique through the phone line.

The gateway for remote control can visit the service website of the manufacturer through an external network. This external network is a generalized network which may include a domain name server (DNS) used for parsing the address from the domain name of the manufacturer service website provided by the gateway for remote control.

There may be one or more service websites of the manufacturer, which is the website provided by the manufacturer producing the controlled devices and used for providing a voice description file for the controlled device. Such a service website of the manufacturer may have other functions, for example, updating the version of the controlled device.

Whether the service website is an actual website does not influence the technical solution of the embodiment of the invention.

The method for implementing the gateway for remote control of the embodiment of the invention includes some appropriate preparation work in the gateway for remote control before the remote control is implemented.

Figure 5:
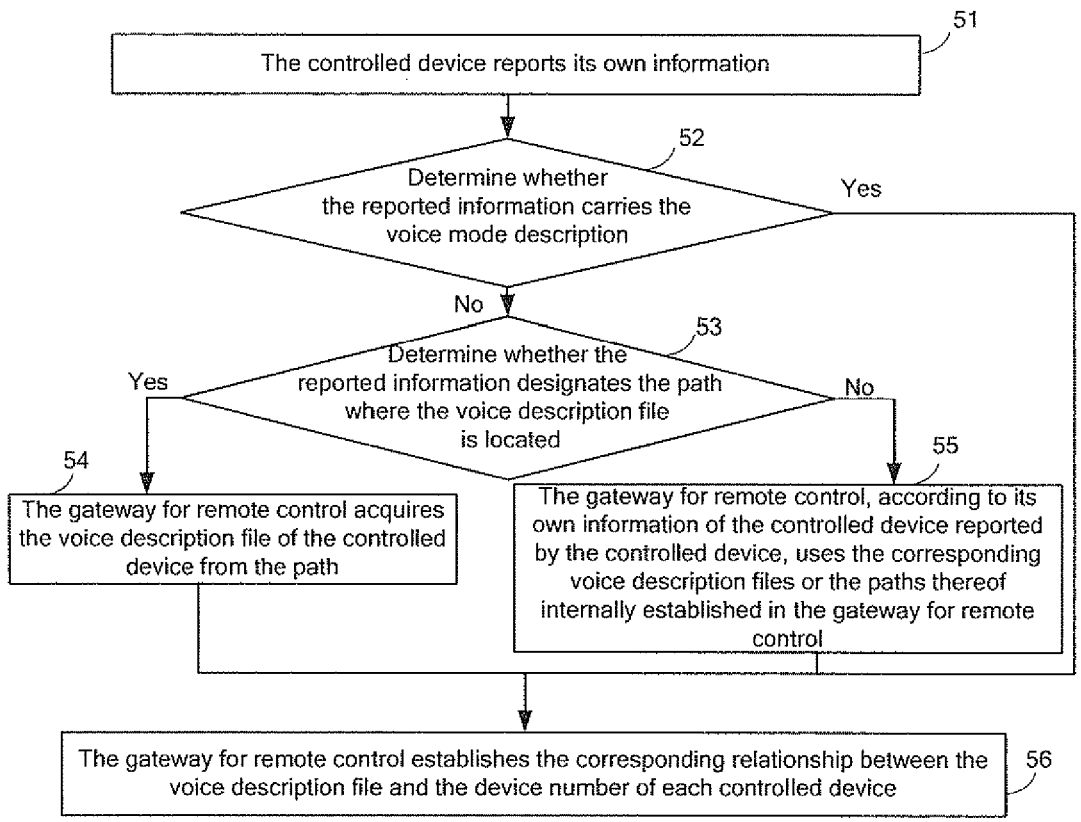
FIG. 5 is a first flowchart illustrating the method for implementing remote control based on the gateway for remote control.

After the controlled device is incorporated in the local network, the information of the controlled device should be reported. The gateway for remote control sets one-to-one corresponding relationship between the voice information of the controlled device and the controlled device according to the reported information. FIG. 5 shows the detailed process.

Step 51: the controlled device reports its own information;

during this process, the gateway for remote control may first set a device number for the controlled device internally or only receive the information reported by the controlled device itself without setting a device number for the controlled device.

Step 52: determine whether the reported information carries description in the voice mode, if the reported information carries the description in the voice mode, proceed to step 56, otherwise, proceed to step 53.

Step 53: determine whether the reported information designates a path where the voice description file is located, if the reported information designates the path, proceed to step 54, otherwise, proceed to step 55;

the path may refer to a path within the local network or in an external network.

Step 54: the gateway for remote control acquires the voice description file of the controlled device from the path;

if the path in an external network is designated but the gateway for remote control has not accessed the external network, the gateway for remote control reports this state information to the user side and is connected to the external network by using the control information of the user side; or the gateway for remote control may be connected to the external network automatically and disconnect automatically from the external network after the call is terminated.

Step 55: the gateway for remote control, according to its own information of the controlled device reported by the controlled device, correspondingly uses the different voice description files or the paths thereof internally established in the gateway for remote control.

The different voice description files established internally in the gateway for remote control include simple voice files such as "device 1, device 2 or device 3", which may contain less content than the voice file reported by the controlled device or provided by the manufacturer.

As various devices emerge endlessly, the gateway for remote control can not interpret the descriptions of all devices in advance to make the devices correspond to different voice files. Therefore, the better method is that the controlled device directly reports a voice mode description file or a path of the voice mode description file.

Step 56: the gateway for remote control establishes a corresponding relationship between the voice description file of each controlled device and each controlled device;

in Step 54, the gateway for remote control may acquire the voice description file of the controlled device first and stores it in the local network, and establishes the corresponding relationship between the voice description file and the controlled device. The gateway for remote control may also only establish the corresponding relationship between the voice description file path and the controlled device, and acquires the voice description file from the network when the description information is needed.

For example, a refrigerator and a television within the local network report their own description files, and the gateway for remote control may record such information as:

device 1, IP1.1.1.1, (the voice description file of device 1)
device 2, IP2.2.2.2, (the voice description file of device 2)

If the voice description file established within the gateway for remote control is used, the home network may not know the specific device, and it is only needed to know the corresponding relationship thereof.

The corresponding relationship between the state information and the address of the voice description file is stored within the device in the local network. The devices tell, according to its own state, the corresponding different addresses to the gateway for remote control. The gateway for remote control accesses the voice description file to which the address corresponds and sends these voices to the user after acquiring them. The device manufacturer can produce and refresh this corresponding relationship according to the demand in the manner of online upgrading, which makes the voice prompt heard by the user more practical and effective, thereby improving the satisfaction of clients.

Figure 6:
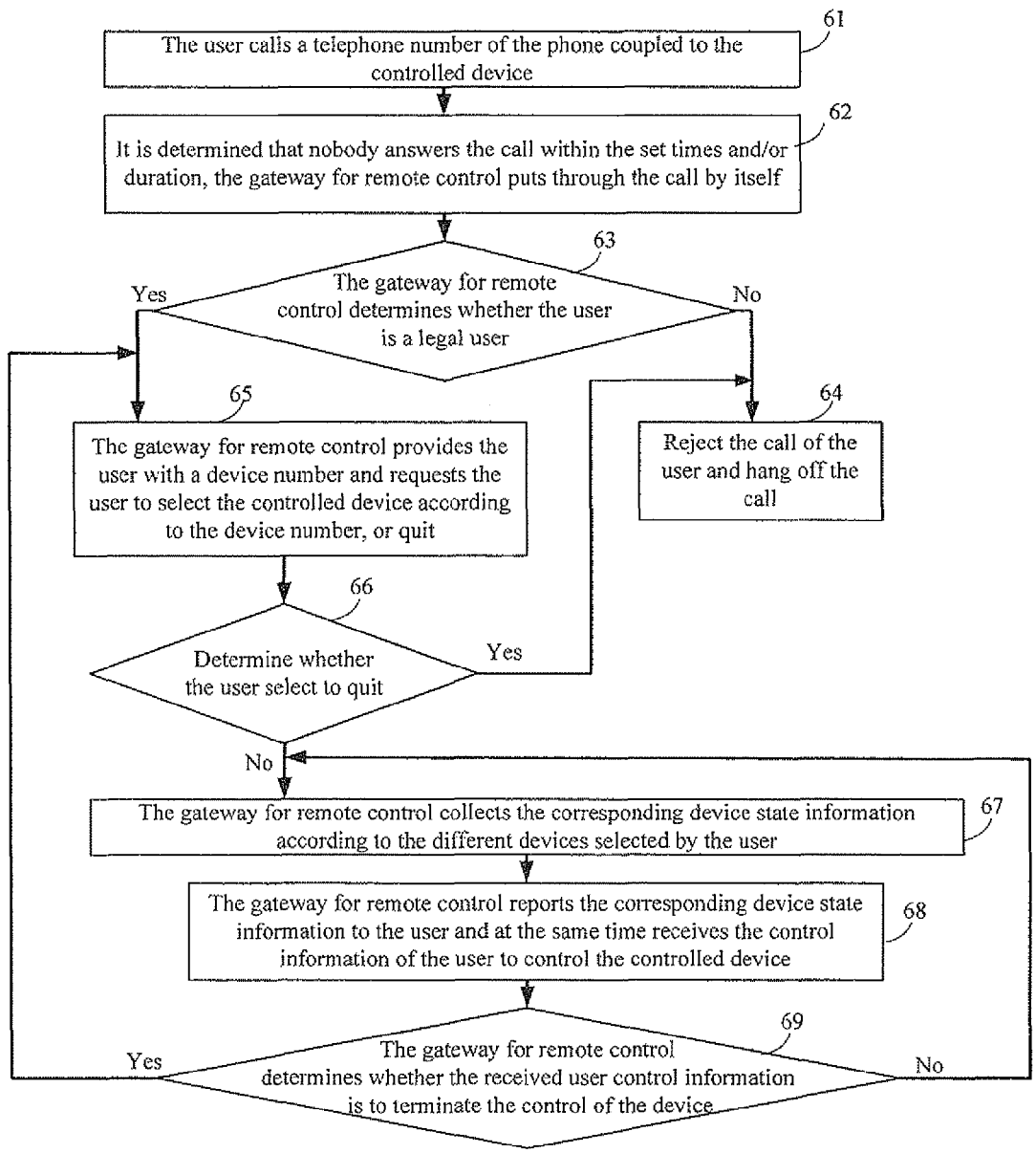
FIG. 6 is a second flowchart illustrating the method for implementing remote control based on the gateway for remote control.

In the method for implementing the gateway for remote control described in the embodiment of the invention, the detailed process of remote control thereof is as shown in FIG. 6.

Step 61: the user calls a telephone number to which the gateway for remote control corresponds.

Step 62: the gateway for remote control determines whether the call has not been answered within preset times and/or duration, if the call has not been answered within the preset times and/or duration, the gateway for remote control puts through the call by itself.

This is an automatic control mode of the system. Once it is determined that nobody answers the call within the preset times and/or duration, the gateway for remote control puts through the call by itself.

Based on the above, the gateway for remote control may also be set in a manned answering state or an unmanned answering state. If it has been set in the unmanned answering state, the gateway for remote control directly puts through the call by itself without determining whether the call has not been answered within the set times and/or duration. This unmanned answering mode is especially applied to the case that the phone terminal has only a phone line but no telephone set. If set as the manned answering state, the gateway for remote control works as mentioned in Step 62.

Step 63: the gateway for remote control determines whether the user is a legal user, if the user is a legal user, proceed to Step 65, and otherwise proceed to Step 64;

Step 64: reject the call of the user and hang off the call;

Step 65, the gateway for remote control provides the user with device numbers and requests the user to select a controlled device according to the device numbers, or quit.

The gateway for remote control may play the pre-recorded voice prompt first, and play the voice description file of the controlled device in turn. For example; "welcome to XX's house, please select the device number and press # to confirm, press * to back to the start menu";

"one" then plays the voice description file of device 1, for example "I am a hero brand refrigerator";

"two" then plays the voice description file of device 2, for example "I am an offspring brand television";

it should be noted that, when an operational key is defined as an exit key by a gateway for remote control, the defined key can not be defined as other functions by the controlled device, for example, the above key * can not be defined as other functions (for example return to a higher level menu).

Step 66: determine whether the user select to quit, if the user select to quit, proceed to Step 64, otherwise, proceed to Step 67.

Step 67: the gateway for remote control collects, according to a different device selected by the user, the corresponding device state information.

Step 68: the gateway for remote control reports the corresponding device state information to the user and at the same time receives the control information of the user to control the controlled device.

The corresponding device state information reported from the gateway for remote control to the user may be as follows;

the state information in the form of a voice file reported by the controlled device;

the location path where the voice file is stored which is reported by the controlled device, wherein the gateway for remote control acquires the voice file from the location path where the voice file is stored as the state information of the controlled device after accessing the network, the path may be a website of the manufacturer in an external network or the address of the device in the local network;

different voice files or paths thereof for describing the controlled devices, wherein the voice files are established by the gateway for remote control according to situation of the controlled devices.

The different voice files established within the gateway for remote control may include: simple voice files such as "device 1, device 2, device 3 . . . " which contain less content than the voice file reported by the controlled device or provided by the manufacturer.

The process of controlling the controlled device by the gateway for remote control includes the steps of collecting the state information of the controlled device, controlling the operation state of the controlled device and adjusting operation parameters of the controlled device etc.

The controlled devices may also send the device state information out in the form of fax; it can send the fax to the user directly or by the gateway for remote control. The user can acquire a written state report of the internal device of the controlled device, so as to record, handle and share the information conveniently.

Step 69: the gateway for remote control determines whether the received user control information is to terminate the control of the device, if the received user control information is to terminate the control of the device, proceed to Step 65, otherwise, proceed to Step 67.

Figure 7:
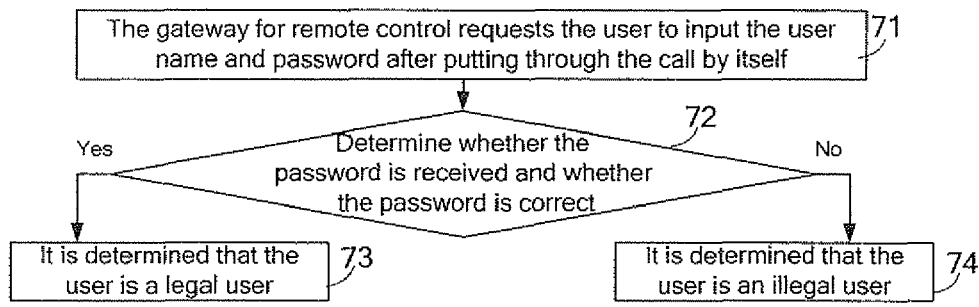
FIG. 7 is a third flowchart illustrating the method for implementing remote control based on the gateway for remote control.

The detailed process of determining whether the user is a legal user by the gateway for remote control in the above Step 63 is as shown in FIG. 7.

Step 71: the gateway for remote control requests the user to input the user name and a password after putting through the call by itself.

Step 72: determine whether the password is received and whether the password is correct, if the password is received and correct, proceed to Step 73, otherwise, proceed to Step 74.

Step 73: it is determined that the user is a legal user,

Different control authorities can be set for different users according to the requirement after it is confirmed that the user is a legal user. For example: the user using password one can configure all the state information of the controlled device; the user using password two can only inquire the state information of the controlled device, or configure some state information. A more complex case is that the process requires the user to input the user name and password to complete the setting of control authority.

Step 74: it is determined that the user is an illegal user.

The above process further includes inquiring and controlling the state information of the gateway for remote control itself; and the state information includes: whether the gateway for remote control has been connected to the external network and whether the remote control function has been turned on. Therefore, the process can inquire the remote control function first and then set the on/off state of the remote control function.

Figure 8:
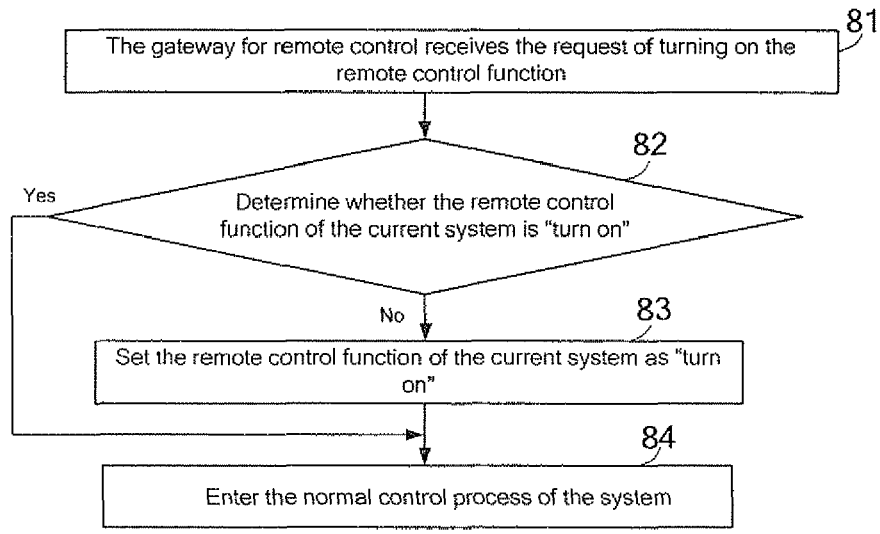
FIG. 8 is a fourth flowchart illustrating the method for implementing remote control based on the gateway for remote control.

FIG. 8 shows the "turn on" processes.

Step 81: the gateway for remote control receives a request of turning on the remote control function from the user.

Step 82: determine whether the remote control function of the current system is "turn on", if the remote control function is turn on, proceed to Step 84, otherwise, proceed to Step 83.

Step 83: set the remote control function of the current system as "turn on".

Step 84: enter the normal control process of the system.

Figure 9:
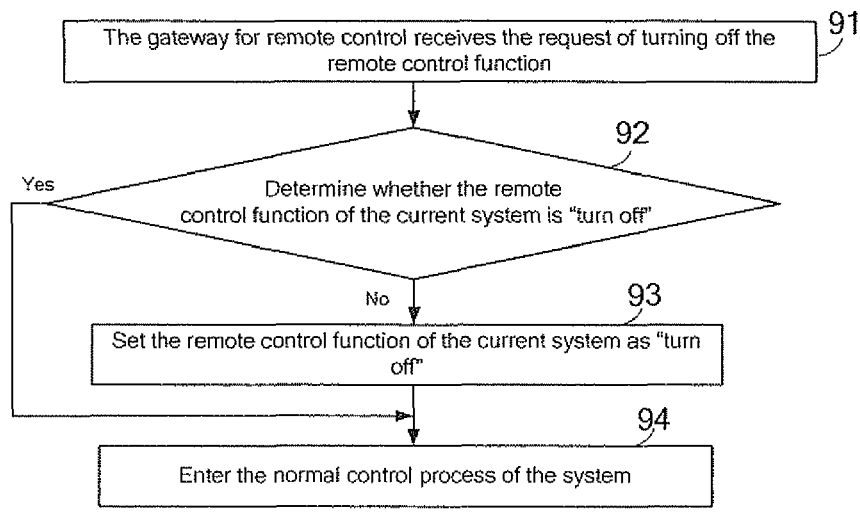
FIG. 9 is a fifth flowchart illustrating the method for implementing remote control based on the gateway for remote control.

FIG. 9 shows the "turn off" processes.

Step 91: the gateway for remote control receives a request of turning off the remote control function of the user.

Step 92: determine whether the remote control function of the current system is "turn off", if the remote control function of the current system is turn off, proceed to Step 94, otherwise, proceed to Step 93.

Step 93: set the remote control function of the current system as "turn off".

Step 94: enter the normal control process of the system.

In the processes, the "turn on" or "turn off" state of the remote control function may be set locally or by the remote control.

The remote control can be implemented by the user dialling a phone number. As the gateway for remote control is accessed by dialling a phone number, the above function is turned on/off according to the voice prompt. It is also possible to notify the operator to which the gateway for remote control belongs to turn on/off the above functions in the operation and maintenance system in the manner of visiting the web page or dialling the service telephone number of the operator by the user.

As to the local setting of the above functions, the local setting can turn on/off the above functions locally through the maintenance platform of the gateway for remote control, such as a key and functional menu of the device or the web page. It is obvious that the setting can be made by entering the gateway for remote control via the local network.

Figure 10:
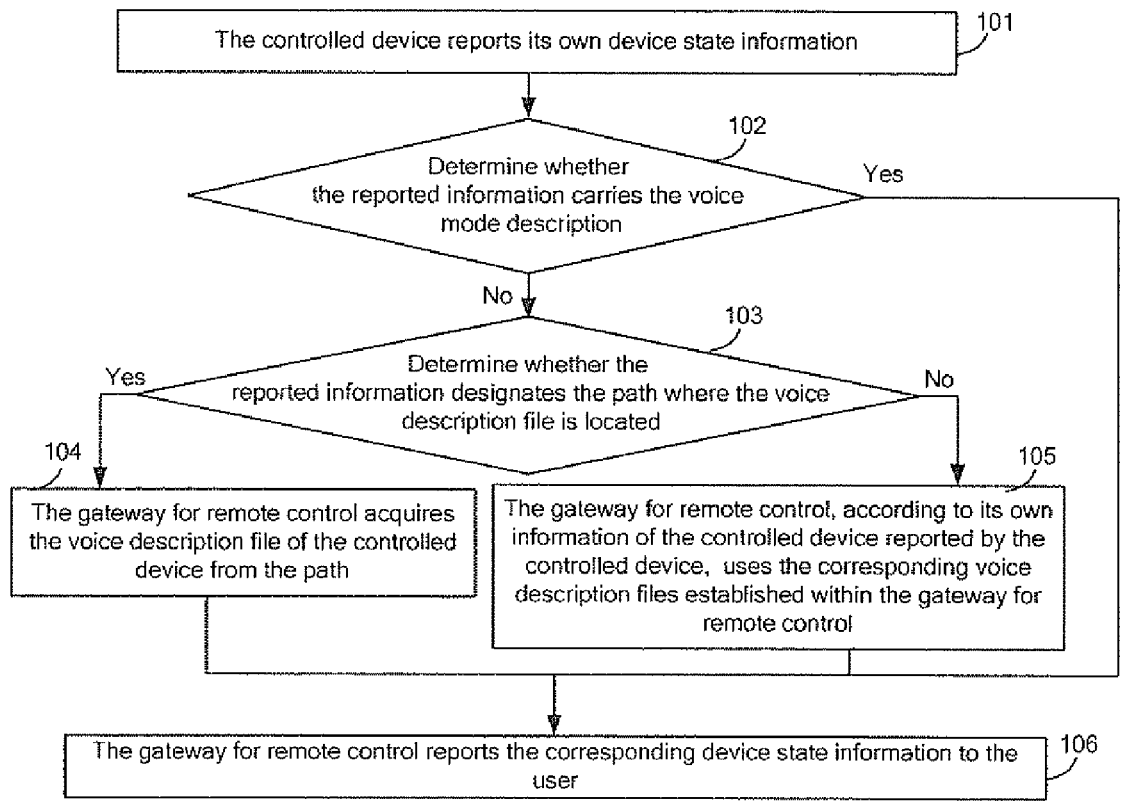
FIG. 10 is a sixth flowchart illustrating the method for implementing remote control based on the gateway for remote control.

The detailed processes of reporting the corresponding device state information to the user by the gateway for remote control is as shown in FIG. 10.

Step 101: the controlled device reports its own device state information.

Step 102: determine whether the reported device state information carries the description in form of voice file, if the reported device state information carries the description in form of voice file, proceed to Step 106, otherwise, proceed to Step 103.

Step 103: determine whether the reported information designates the path where the voice file is located, if the reported information designates the path where the voice file is located, proceed to Step 104, otherwise, proceed to Step 106; the path may refer to a path within the local network or in an external network.

Step 104: the gateway for remote control acquires the voice mode information of the controlled device from the path.

If the path in an external network is designated but the gateway for remote control has not accessed the external network, the gateway for remote control reports this state information to the user side and is connected to the external network by using the control information of the user side; or the gateway for remote control may connect to the external network and disconnect from the external network automatically after the call is terminated.

If the voice prompt file is located in the service web page of the manufacturer, the cost and technique requirement for both the gateway for remote control and the internal device of the local network can be reduced.

Step 105: the gateway for remote control, according to its own information of the controlled device reported by the controlled device, uses the corresponding voice files or the paths thereof established within the gateway for remote control.

In the device state information that will be reported, the different voice files established within the gateway for remote control includes simple voice description such as "the current temperature of device one is twenty-five Celsius degree, twenty-six Celsius degree, twenty-seven Celsius degree" and the like.

As various devices emerge endlessly, the gateway for remote control can not pre-interpret the descriptions of all device states to correspond to the different voice files. Therefore, the better method is that the controlled device directly reports the voice mode description file or a path of the voice mode description file.

It is obvious that the manufacturer can save the voice file in its own service web page, produce and refresh the voice file according to the demand, which make the voice prompt heard by the user more practical and effective, thereby improving the satisfaction of clients.

Step 106: the gateway for remote control reports the corresponding device state information to the user.

It can be concluded from the foregoing descriptions that the embodiments of the present invention have the following advantages.

The embodiments of the present invention make it possible to know and control a controlled device of the local network through a gateway for remote control that need not be online all the time.

The remote control implemented in the embodiments of the invention has wide coverage and features convenient application, and the cost thereof is low because the user need not buy a special device or a mobile phone with the surfing function.

In the implementing process of the embodiments of the invention, the operation is simple and convenient, and the technical requirement is low.

In the implementing process of the embodiments of the invention, the control in real time can be implemented for the controlled device, and the response speed thereof is very fast in the remote control process.

The voice prompt is defined by its own internal device of the local network in the embodiments of the invention so as to enhance the expansibility and compatibility of the gateway for remote control.

The voice prompt may also be set in the service web page of the manufacturer in the embodiments of the invention. In this way, the demand for the technique and cost of the gateway for remote control is reduced on one hand; on the other hand the demand for the technique and cost of the internal devices of the local network is reduced; at the same time the manufacturer can make advertisements by using this voice prompt.

In the embodiments of the invention, if the fax function is used, the user who initiates the remote control may also acquire a written state report of the internal devices of the local network, which makes it convenient for the user to record, handle and share the information.

In the embodiments of the invention, the user can directly control the device of the network through making a call; therefore, the expense that is needed in the implementing process of this invention is very low and is not restricted by the location of the user who initiates the control.

The foregoing is only preferred embodiments of this invention. The protection scope of this invention, however, is not limited to the above description. Any change or substitution, within the technical scope disclosed by this invention, easily occurring to those skilled in the art should be covered by the protection scope of this invention. Therefore, the protection scope of the present invention should be according to claims.

What is claimed is:

1. A gateway for remote control, at least comprising:
    an information receiving and processing module coupled to a phone line and configured to receive and process control information sent through the phone line by a user;
    an information transmitting module respectively coupled to the information receiving and processing module and the phone line, configured to receive device state information of a controlled device and send the device state information to the user through the phone line, wherein the device state information which is in the form of a voice file is received from the controlled device if the device state information reported from the controlled device carries the voice file;
    a controlling signal generating module coupled to the information receiving and processing module and configured to generate corresponding controlling signal according to the control information received by the information receiving and processing module and a corresponding relationship between controlled device description information and the controlled device established and stored in the gateway for remote control; and
    a controlling signal sending module respectively coupled to the controlling signal generating module and the controlled device, and configured to send controlling signal generated by the controlling signal generating module to the controlled device coupled to the controlling signal sending module;
    wherein establishing the corresponding relationship between the controlled device description information and the controlled device includes:
        the controlled device accessing the gateway for remote control, and the gateway for remote control acquiring description information of the controlled device;
        recording description information of the controlled device, and establishing the corresponding relationship between the description information of the controlled device and the controlled device by the gateway for remote control;
        wherein in the process of the gateway for remote control acquiring description information of the controlled device, the description information of the controlled device comprises at least one of:
            a voice file reported by the controlled device;
            a location path where the voice file is stored which is reported by the controlled device to the gateway for remote control, wherein the path is a website of the manufacturer in an external network or the address of the device in the local network, and the gateway for remote control acquires the voice file from the location path as the state information of the controlled device upon accessing the network; and
            different voice files for describing the controlled device, wherein the different voice files are established by the gateway for remote control according to situation of the controlled devices.

2. The gateway for remote control of claim 1, wherein the information receiving and processing module is configured to further determine whether the control information is control information for controlling the gateway for remote control itself; control the state of the gateway for remote control if the control information is the control information for controlling the gateway for remote control itself; otherwise send the control information to the controlling signal generating module.

3. The gateway for remote control of claim 1, wherein the phone line comprises:
    a fixed phone line over Public Switched Telephone Network (PSTN), or a phone line of wireless mode or an IP accessing phone line.

4. The gateway for remote control of claim 1, further comprising:
    a phone signal processing module coupled to the phone line in front of the information receiving and processing module, configured to put the information receiving and processing module through to the user when determining that the call is not put through.

5. A system based on a gateway for remote control, comprising: a phone line, a gateway for remote control, and a controlled device; wherein
    the gateway for remote control is configured to receive device state information of the controlled device and process control information sent through the phone line by the user, generate corresponding controlling signal according to the control information and a corresponding relationship between controlled device description information and the controlled device stored in the gateway for remote control, send the controlling signal to the controlled device, and establish the corresponding relationship between the controlled device description information and the controlled device;
    wherein the device state information which is in the form of a voice file is received from the controlled device if the device state information reported from the controlled device carries the voice file;
    wherein establishing the corresponding relationship between the controlled device description information and the controlled device includes:
        the controlled device accessing the gateway for remote control, and the gateway for remote control acquiring description information of the controlled device;
        recording description information of the controlled device, and establishing the corresponding relationship between the description information of the controlled device and the controlled device by the gateway for remote control;
        wherein in the process of the gateway for remote control acquiring description information of the controlled device, the description information of the controlled device comprises at least one of:
            a voice file reported by the controlled device;
            a location path where the voice file is stored which is reported by the controlled device to the gateway for remote control, wherein the path is a website of the manufacturer in an external network or the address of the device in the local network, and the gateway for remote control acquires the voice file from the location path as the state information of the controlled device upon accessing the network; and different voice files for describing the controlled device, wherein the different voice files are established by the gateway for remote control according to situation of the controlled devices.

6. The system of claim 5, wherein the phone line comprises a fixed phone line over Public Switched Telephone Network (PSTN), or a phone line of wireless mode or an IP accessing phone line.

7. The system of claim 5, wherein the gateway for remote control further communicates with a service website of the controlled device manufacturer through an external network.

8. The system of claim 5, wherein the gateway for remote control connects to the controlled device through a local network.

9. The system of claim 5, wherein the controlled device comprises at least one of: a personal computer and an intelligent electrical apparatus.

10. A method for implementing remote control, comprising:

receiving, by a gateway for remote control, a call from a user, and putting through the call;

receiving, by a gateway for remote control, device state information of a controlled device;

sending, by the gateway for remote control, the device state information to the user; and receiving and processing, by the gateway for remote control, control information sent through a phone line by the user;

generating, by the gateway for remote control, corresponding controlling signal according to the control information and a corresponding relationship between controlled device description information and the controlled device stored in the gateway for remote control;

sending, by the gateway for remote control, the controlling signal to the controlled device;

wherein the device state information which is in the form of a voice file is received from the controlled device if the device state information reported from the controlled device carries the voice file;

establishing the corresponding relationship between the controlled device description information and the controlled device, including:

the controlled device accessing the gateway for remote control, and the gateway for remote control acquiring description information of the controlled device;

recording description information of the controlled device, and establishing the corresponding relationship between the description information of the controlled device and the controlled device by the gateway for remote control;

wherein in the process of the gateway for remote control acquiring description information of the controlled device, the description information of the controlled device comprises at least one of:

a voice file reported by the controlled device;

a location path where the voice file is stored which is reported by the controlled device to the gateway for remote control, wherein the path is a website of the manufacturer in an external network or the address of the device in the local network, and the gateway for remote control acquires the voice file from the location path as the state information of the controlled device upon accessing the network; and different voice files for describing the controlled device, wherein the different voice files are established by the gateway for remote control according to situation of the controlled devices.

11. The method of claim 10, wherein a telephone number to which the gateway for remote control corresponds is called by the user; if the call is not put through, the gateway for remote control puts through the call by itself.

12. The method of claim 10, wherein after putting through the call the method further comprises:

determining, by the gateway for remote control, whether the calling user is a legal user; if the calling user is a legal user, the gateway for remote control exchanging information with the controlled device, controlling the controlled device or acquiring state information of the controlled device, otherwise, rejecting the call.

13. The method of claim 10, wherein before receiving the device state information of the controlled device, the method further comprises:

selecting the controlled device according to the control information from the user by the gateway for remote control.

14. The method of claim 10, wherein in the process of the gateway for remote control acquiring description information of the controlled device, if the gateway for remote control has not been connected to an external network, the gateway for remote control reports this state information to the user and is connected to the external network through using the control information of the user, or connects to the external network automatically and disconnects from the external network by itself upon the call being terminated.

15. The method of claim 10, wherein in the process of sending the device state information to the user, if the gateway for remote control has not been connected to an external network, the gateway for remote control reports this state information to the user and is connected to the external network through using the control information of the user, or connects to the external network automatically and disconnects from the external network by itself upon the call being terminated.

16. The method of claim 10, further comprising:

inquiring and setting state information of the gateway for remote control by the gateway for remote control; wherein the state information comprises whether the gateway for remote control connects to the external network and whether the remote control function is turned on.

17. The method of claim 10, further comprising:

receiving a turning on request from the user;

determining whether a remote control function of a current system has been turned on; and setting the remote control function of the current system as "turn on" if the remote control function of the current system has not been turned on.

18. The method of claim 10, further comprising:

receiving a turning off request from the user;

determining whether a remote control function of a current system has been turned off; and setting the remote control function of the current system as "turn off" if the remote control function of the current system has not been turned off.

* * * * *